(12) United States Patent
Finkelstein

(10) Patent No.: US 10,819,497 B2
(45) Date of Patent: *Oct. 27, 2020

(54) SYSTEMS AND METHODS FOR STATIC HALF-DUPLEX SPECTRUM ALLOCATION ON A DUPLEX BAND

(71) Applicant: Cox Communications, Inc., Atlanta, GA (US)

(72) Inventor: Jeffrey Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/182,318

(22) Filed: Nov. 6, 2018

(65) Prior Publication Data

US 2020/0145178 A1 May 7, 2020

(51) Int. Cl.
*H04L 5/16* (2006.01)
*H04L 5/00* (2006.01)

(52) U.S. Cl.
CPC ............ *H04L 5/16* (2013.01); *H04L 5/0098* (2013.01)

(58) Field of Classification Search
CPC .................................. H04L 5/16; H04L 5/0098
See application file for complete search history.

(56) References Cited

U.S. PATENT DOCUMENTS

| 2018/0219621 A1* | 8/2018 | Zinevich | H04B 10/0773 |
| 2018/0248360 A1* | 8/2018 | Mori | H04N 21/40 |
| 2019/0215781 A1* | 7/2019 | Jeon | H04W 24/10 |
| 2019/0386808 A1* | 12/2019 | Finkelstein | H04L 12/189 |
| 2020/0045745 A1* | 2/2020 | Cirik | H04W 74/0833 |

* cited by examiner

*Primary Examiner* — Charles C Jiang
*Assistant Examiner* — Ryan C Kavleski
(74) *Attorney, Agent, or Firm* — Eversheds-Sutherland (US) LLP

(57) ABSTRACT

Embodiments of the disclosure are generally directed to disabling sounding, resource-block allocation, and various full-duplex (FDX) capabilities in a portion of a spectrum used in FDX-enabled cable networks. The disclosure further describes dynamically using an upstream mode or a downstream mode of communication for half-duplex communication in the portion of the spectrum originally designated for FDX communication, for a given time interval. In another embodiment, the disclosure can thereby facilitate an increase in upstream or downstream capacity on the cable network, for example, a fifteen-fold increase in the upstream capacity or downstream capacity. In some embodiments, control messages can be transmitted from a controller node to devices on the network periodically, describing the usage of the FDX portion of the spectrum for upstream or downstream transmission. The control messages can include medium access control (MAC) management messages and/or tag-length-value (TLV) messages.

21 Claims, 7 Drawing Sheets

SYSTEMS AND METHODS FOR STATIC HALF-DUPLEX SPECTRUM ALLOCATION ON A DUPLEX BAND

BACKGROUND

A variety of service providers, such as cable providers and satellite providers, may connect user devices to one or more networks, such as cable networks and/or the Internet. A provider may provide cable and/or Internet access to a residence via devices such as headend devices that includes a computer system and databases required for provisioning of content. The headend may include a cable modem termination system (CMTS), which can send and receive cable modem signals on a cable network to provide Internet services to cable subscribers. However, the residence may experience issues such as congestion, speed losses, pricing spikes, service interruptions, and the like that can degrade the user experience.

BRIEF DESCRIPTION OF THE DRAWINGS

Reference will now be made to the accompanying drawings, which may not necessarily be drawn to scale, and wherein.

DETAILED DESCRIPTION OF VARIOUS EMBODIMENTS

Figure 1:
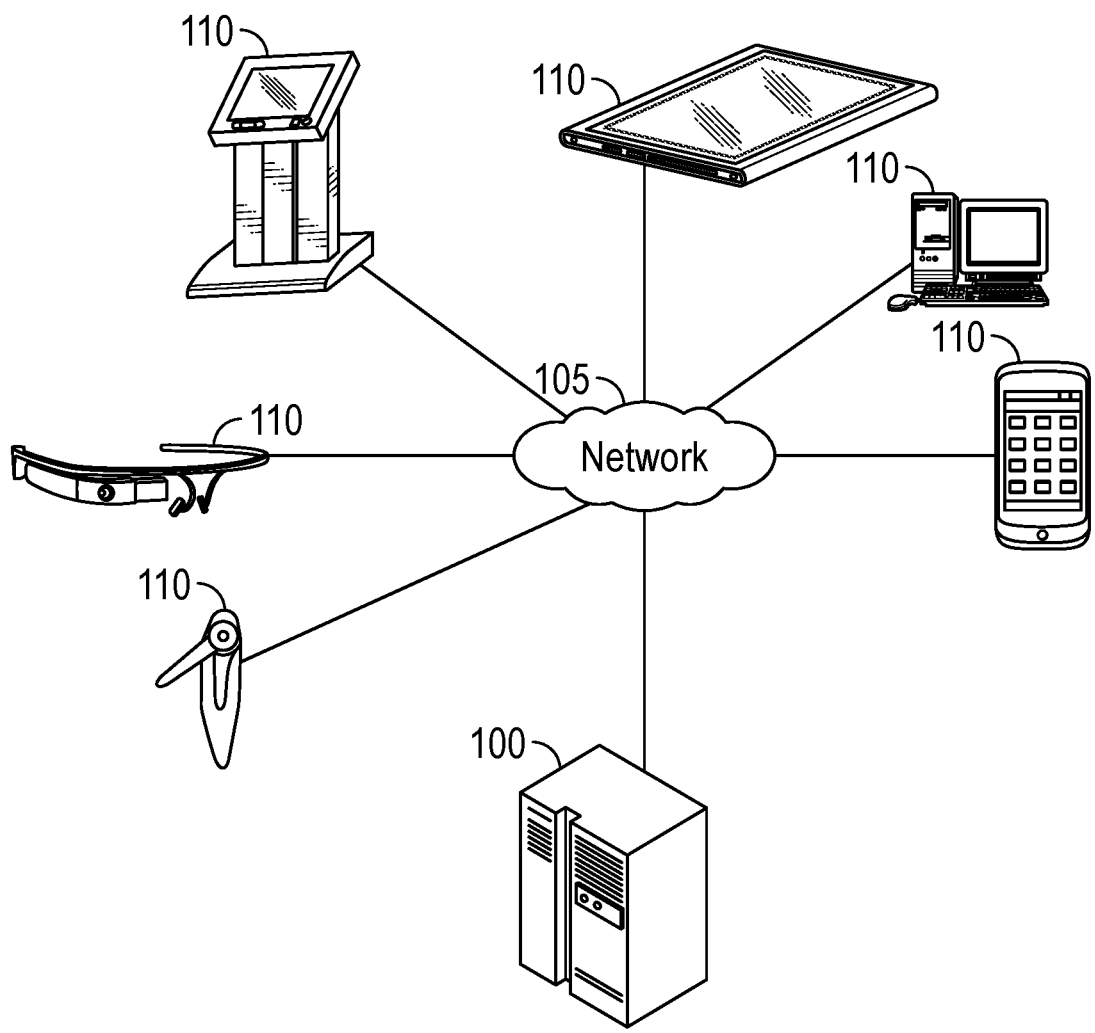
FIG. 1 shows an example schematic diagram of a system that can be used to practice embodiments of the present disclosure.

The details of one or more embodiments of the subject matter described herein are set forth in the accompanying drawings and the description below. Other features, aspects, and advantages of the subject matter will become apparent from the description, the drawings, and the claims.

Embodiments of the disclosure are generally directed to disabling sounding, resource-block allocation, and various full-duplex (FDX) capabilities in a portion of a spectrum used in FDX-enabled cable networks. The disclosure further describes dynamically enabling and using an upstream mode or a downstream mode of communication in the portion of the spectrum (e.g., enabling a half-duplex mode of operation) originally designated for FDX communication, for a given time interval. In another embodiment, the disclosure can thereby facilitate an increase in upstream or downstream capacity on the cable network, for example, a fifteen-fold increase in the upstream capacity or downstream capacity. In some embodiments, control messages can be transmitted from a controller node to devices on the network periodically, describing the disabling of the FDX portion of the spectrum and its alternative usage for half-duplex upstream or downstream transmission. The control messages can include medium access control (MAC) management messages and/or tag-length-value (TLV) messages.

In some aspects, embodiments of the disclosure describe sending, by a device (e.g., a device having MAC layer capabilities), a message to a group of receiving devices (e.g., one or more cable modems), the message including a first frequency band for receiving first downstream communication from the device. Moreover, the message may further include a second frequency band for: (i) a first directional communication between the device and a first device of the group of receiving devices over a first time interval, or (ii) a second directional communication from the first device to a second device of the group of receiving devices over a second time interval. In one aspect, the directional communication may include an upstream communication or a second downstream communication. Further, the message may further include instructions to disable sounding and resource block allocation in the second frequency band.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

I. COMPUTER PROGRAM PRODUCTS, METHODS, AND COMPUTING ENTITIES

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random-access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random-access memory (FJG RAM), Millipede memory, racetrack memory, and/or the like.

In one embodiment, a volatile computer-readable storage medium may include random-access memory (RAM), dynamic random-access memory (DRAM), static random-access memory (SRAM), fast page mode dynamic random-access memory (FPM DRAM), extended data-out dynamic random-access memory (EDO DRAM), synchronous dynamic random-access memory (SDRAM), double data rate synchronous dynamic random-access memory (DDR SDRAM), double data rate type two synchronous dynamic random-access memory (DDR2 SDRAM), double data rate type three synchronous dynamic random-access memory (DDR3 SDRAM), Rambus dynamic random-access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random-access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE SYSTEM ARCHITECTURE

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

In various aspects, the management computing entities 100 may include various devices on a cable network, including, but not limited to, switches, MAC devices, cable modem termination system (CMTS) devices, converged cable access platform (CCAP) devices, remote PHY devices, amplifiers, fiber nodes, and the like, to be variously described below. In another aspect, such devices may include circuitry (e.g., processors and memory) and associated software instructions (e.g., computer code) to perform various functions associated with such devices (e.g., transmit packets, receive packets, process packets, sort packets, provide status updates, download and install software updates, etc.).

In another aspect, the networks 105 may include, but not be limited to, cable networks including hybrid fiber-coaxial cable networks. More broadly, the networks 105 may include at least portions of wireless networks or wired networks. In another aspect, a cable network may use various sub-networks (e.g., Wi-Fi networks, cellular networks) to perform aspects of the functionality described herein, for example, in connection with the disclosed devices (e.g., switches, remote MAC devices, CMTS devices, remote PHY devices, amplifiers, fiber nodes, and the like).

In another aspect, the user devices 110 may include, but not be limited to, devices associated with a customer premise equipment (e.g., one or more devices at a customer home). Non-limiting examples may include, but not be limited to, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, cable modems, relays, routers, network access points, base stations, the like, and/or any combination of devices or entities adapted to perform the functions, operations, and/or processes described herein.

1. Example Management Computing Entity

Figure 2:
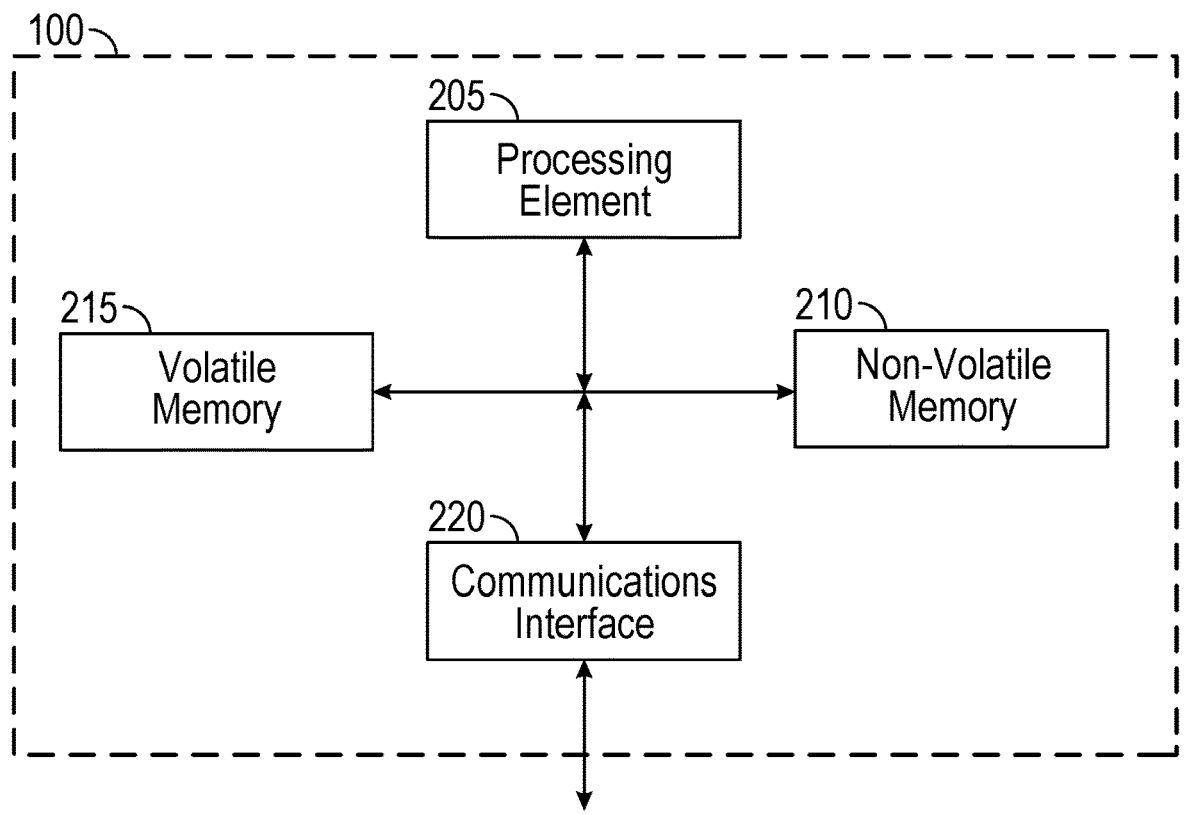
FIG. 2 shows an example schematic diagram of a management computing entity, in accordance with example embodiments of the disclosure.

FIG. 2 provides a schematic of a management computing entity 100 according to one embodiment of the present disclosure. As noted above, a management computing entity 100 may include various devices on a cable network, including, but not limited to, switches, MAC devices, CMTS devices, CCAP devices, remote PHY devices, amplifiers, fiber nodes, and the like, to be described below (see for example, FIGS. 4-5 and related discussion).

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, cable modems, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products.

Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

2. Example User Device

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. In some aspects, user devices 110 may include, but not be limited to, devices associated with a customer premise equipment, as described above. In another aspect, the user device 110 may be configured to receive data from a fiber node (e.g., fiber nodes 504 and 508 to be shown and described in connection with FIG. 5), or to receive data from a remote PHY device (e.g., a remote PHY device 508 to be shown and described in connection with FIG. 5).

Figure 3:
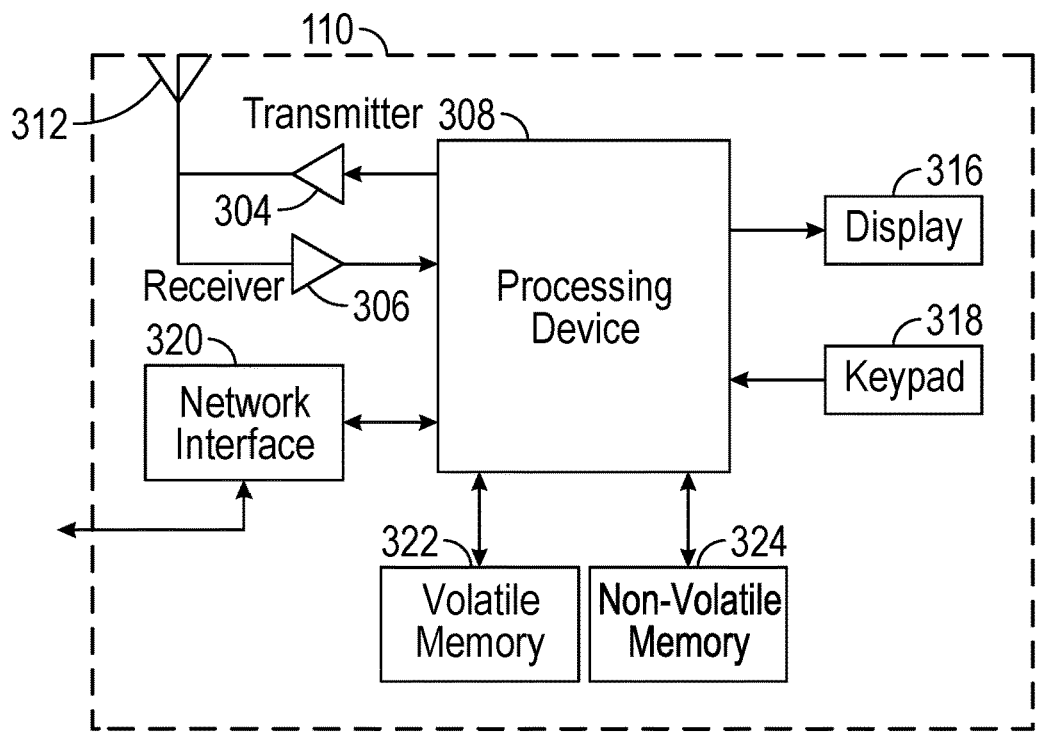
FIG. 3 shows an example schematic diagram of a user device, in accordance with example embodiments of the disclosure.

FIG. 3 provides an illustrative schematic representative of a user device 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example radio), a receiver 306 (for example radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

III. EXAMPLE SYSTEM OPERATION

In cable networks, simplex communication can refer to a communication channel that sends information in one direction only (e.g., from a transmitter to a receiver or vice-versa). In some embodiments, a broadcast type communication (e.g., a cable TV transmission) may be a simplex communication, since the headend or similar device may transmit the broadcasted signal in one direction to one or more devices, but the receiving devices do not send information back to the headend.

In contrast, a half-duplex system can refer to a communication channel that allows for communication in both directions (e.g., from a transmitter to a receiver and from the receiver to the transmitter), but only one direction at a time (not simultaneously). In some embodiments, once a receiver begins receiving a signal, the receiver may wait for the transmitter to stop transmitting, before replying. Half-duplex systems may be used to conserve bandwidth, since only a single communication channel is needed, which is shared alternately by the devices transmitting and receiving on the two directions. In some embodiments, if more than one device transmits data at the same time on the same half-duplex channel, a collision may occur, resulting in lost messages.

In some embodiments, a full-duplex (FDX) system can refer to a communication channel that allows for communication in both directions, and, unlike half-duplex, allows this to happen simultaneously. In another embodiment, full-duplex Ethernet (which may be employed between devices on at least a portion of a cable network) employs wired connections that may make simultaneous use of two physical twisted pairs of wires inside the same jacket, which may be directly connected to each networked device. In some embodiments, one pair of wires can be used for receiving packets, and another pair of wires may be used for sending packets. Accordingly, the cable itself may be a collision-free environment and may serve to double the maximum total transmission capacity supported by each Ethernet connection. In some embodiments, there may be fewer collisions in full-duplex connections, so that time is not wasted by having to retransmit frames. Moreover, full transmission capacity is available in both directions because the send and receive functions may be separated. Further, there may only be one transmitter on each twisted pair, so devices may not need to wait for other devices to complete their transmissions.

As will be described in further detail below, in some full-duplex communication deployments, the spectrum over which the devices (e.g., transmitters and receivers) may communicate may be partitioned as follows. The communication spectrum may include a first upstream communication portion for use by legacy devices, a second upstream communication portion, an unusable portion of the spectrum, a portion of the spectrum for upstream and downstream communication (corresponding to full-duplex), and a downstream communication region. In some embodiments, described herein are systems, methods, and apparatuses for converting the portion of the spectrum that is designated for upstream and downstream communication (e.g., a full-duplex portion of the spectrum in a full-duplex cable network deployment) to a portion that is used for either (i) an upstream mode of transmission while disabling downstream communication, or (ii) a downstream mode of transmission while disabling the upstream communication (e.g., a half-duplex mode of communication). In some embodiments, the determination of whether the full-duplex portion of the spectrum will serve as an upstream mode or a downstream mode of transmission (instead of a full-duplex mode of transmission), may be determined dynamically (e.g., by a network controller and/or scheduler), and may be based on many factors (e.g., network congestion, device capability, device load, type of data being transmitted, and the like, to be elaborated on herein). In some embodiments, the portion of the spectrum that may correspond to a convertible full-duplex mode may be between approximately 108 MHz and approximately 204 MHz (or up to 684 MHz in some example deployments).

As noted, the portion of the spectrum that may correspond to a convertible full-duplex mode can be dynamically converted into an upstream or downstream mode of communication in a half-duplex mode based on the capacity needs of the network. Moreover, the portion of the spectrum may be converted to either the upstream or downstream mode of communication by using control messaging. For example, if it is determined that there is significant upstream traffic on the network, a control message may be sent, by a transmitting device or a general control device on the network, to a receiving device (e.g., at the medium access control (MAC) or physical (PHY) layer) to convert the full-duplex portion of the spectrum to a half-duplex upstream mode of communication to increase upstream throughput. Alternatively, if it is determined that there is an excessive amount of downstream traffic on the network, the control message may be sent, by a transmitting device or a general control device on the network, to a receiving device (e.g., at the MAC or PHY layer) to convert the full-duplex portion of the spectrum to a half-duplex downstream mode of communication to increase downstream throughput. In some embodiments, the control messages may need to be sent periodically (e.g., every 100 milliseconds), to maintain the optimal transmission of the network. Accordingly, the full-duplex portion of the spectrum may be dynamically converted (e.g., dynamically in time) to a static upstream band (e.g., unchanging in upstream frequency bandwidth) or a static downstream band (e.g. unchanging in the downstream frequency bandwidth) several times in a given period to maintain a traffic flow rate above a predetermined threshold value. Moreover, the messaging may be sent from a MAC layer of the control device (e.g., using MAC management messages).

As noted, the conversion of the full-duplex portion of the spectrum to a half-duplex upstream or downstream mode of communication to increase network throughput may be based on several factors. For example, a network may need to transmit a broadcast or multicast signal to multiple devices, and may determine to do so using the full-duplex portion of the spectrum locked into a downstream mode of communication for a predetermined period of time. In another embodiment, a particular business using cable networks may be performing backups of devices by transmitting copies of local data to an upstream server; accordingly, the network may determine to do so using the full-duplex portion of the spectrum locked into an upstream mode of communication for a predetermined period of time. Other example factors that may be used by the MAC layer on a given device (e.g., a transmitting device or a controlling device) to determine the type of transmission (e.g., static upstream or static downstream) to convert the full-duplex region into may include, but not be limited to, the type and content of traffic (e.g., video, audio, secure transmission, high-priority transmissions, etc.), video latency issues involving real-time traffic flow, and the like.

In another embodiment, the MAC layer may sense the underlying factors (e.g., bandwidth usage requests in the upstream or downstream, the traffic type and priority, etc.), and may communicate, via control messages, to a remote device how to allocate and convert the full-duplex spectrum to a half-duplex mode of communication. In one aspect, the PHY layer may be used, in conjunction with the MAC layer, to map the MAC layer control requests into the actual spectrum for a given device or set of devices. This may be because, there may be multiple receiver blocks of spectrum and multiple transmitter blocks of spectrum, and some blocks may overlap with each other in time. Accordingly, the PHY layer may be responsible for generating maps of the spectral usage of one or more transmitting devices and receiving device in time, and coordinate with the MAC layer to implement the efficient and relatively collision-free conversion of the portions of the full-duplex spectrum to a half-duplex mode for the various devices in time. In particular, the PHY layer may be used to communicate to the customer premise devices through a map to specify when the devices should convert the full-duplex bands into either an upstream or downstream mode of communication and the duration for which to maintain such a mode of communication. In some embodiments, the receiving device (e.g., a cable modem) may receive the map, decode the map, and thereby determine which regions of the full-duplex spectrum to transmit on, or which regions of the full-duplex spectrum to receive on for a given time-frame.

Some service providers, such as cable network providers, may use various techniques, such as frequency division duplexing (FDD) or time division duplexing (TDD), for the transmission of content on a cable network. In FDD, upstream and downstream traffic may be transmitted on different portion parts of the spectrum. In some data over cable service interface specification (DOCSIS) network specifications, a first part of the spectrum can be allocated for upstream traffic and a second part of the spectrum can be allocated for downstream traffic over the network. As used herein, DOCSIS can refer to telecommunications specifications that facilitates the addition of high-bandwidth data transfer to a cable network system. In TDD, the upstream and downstream traffic may share the same spectrum but may take turns in using the spectrum. In full-duplex DOCSIS, the upstream and downstream traffic can use the same spectrum simultaneously. This may allow for an increase in the efficiency of spectrum use in some cases. A DOCSIS 3.1 full duplex (FDX) network can provide the speed and flexibility of TDD solutions and can improve upon both TDD and FDD by increasing the capacity of the network, as described below.

In some embodiments, the DOCSIS specification can enable the deployment of data-over-cable systems on a nonproprietary, multivendor, interoperable basis for bidirectional transfer of Internet Protocol (IP) traffic between a cable system headend and customer equipment over an all-coaxial or hybrid-fiber/coax (HFC) cable network. In another embodiment, hybrid-fiber-coaxial (HFC) can refer to a broadband network that combines optical fiber and coaxial cable. In some embodiments, the system can include a CMTS or access controller node located at the headend, a coaxial or HFC medium, and cable modems (CMs) located at the premises of the customer, in conjunction with DOCSIS-defined layers that support interoperability features. In some embodiments, the CMTS or access controller node can refer to a piece of equipment, for example, equipment located in a cable company's headend or hubsite, which can be used to provide data services, such as cable Internet or Voice over Internet Protocol (VoIP). In some embodiments, the CMTS or access controller node can include aspects of the functionality of the management computing entity 100, described above.

In addition, the DOCSIS specification can define means by which a CM can self-discover the appropriate upstream and downstream frequencies, bit rates, modulation format, error correction, and power levels, and the like, for transmission over the cable network. In some embodiments, a cable modem (CM) can refer to a network bridge that can conform to one or more standards, for example, IEEE 802.1D for Ethernet networking. In some embodiments, a cable modem can modulate data to transmit over the cable network and can demodulate data from the cable network to receive the data. In some embodiments, the CM can serve as both a physical layer (layer-1) device and a data link layer (layer-2) forwarder. Moreover, the cable modem can serve as an IP addressable network node; therefore, CMs can support functionality at other layers. In some embodiments, CMs may incorporate a router and a dynamic host configuration protocol (DHCP) server to provide a local area network (LAN) with internet protocol (IP) network addressing. In some embodiments, a CM can have its own IP address and Medium Access Control (MAC) address, as can a router on the network.

In legacy DOCSIS embodiments, data may be transmitted in one direction (for example, upstream or downstream) across the spectrum. Accordingly, as compared with passive optical networks (PONs), a cable network using legacy DOCSIS standards may be limited in terms of symmetrical data speeds across the network, for example, due to upstream spectrum limitations. With DOCSIS 3.1, multi-gigabit data transmission and a deployment of orthogonal frequency division multiplexing (OFDM) along with a remote PHY architecture, full-duplex (FDX) data transmission can be possible. That is, with FDX DOCSIS, the RF spectrum can be used simultaneously in both the upstream (US) and downstream (DS) directions in the same portion of the spectrum. This can allow for higher throughput US and DS transmission over the network.

As noted, in some FDX communication deployments, spectrum can be partitioned as follows. The spectrum can have a first upstream communication portion for use by legacy devices, a second upstream communication portion, an unusable portion of the spectrum (which can, in some cases, correspond to a diplex roll-off associated with filters and/or other network devices), a portion of the spectrum for upstream and downstream communication (corresponding to FDX), and a downstream communication region.

As mentioned, in FDX, the network can support bi-directional transmissions across the same portion of the spectrum. Therefore, in FDX networks techniques for reducing signal interferences between the bi-directional transmissions may be needed. Further, DOCSIS can be implemented on point to multi-point systems, where multiple CMs are connected to the same cable modem termination system (CMTS) port, for example, via a coax distribution line. When a given CM transmits US signals to the CMTS, the US signal may leak through the cable plant and can interfere with signals in the DS direction, for example, at the receiving CMs. However, since the source of the interference may be unknown to the receiving CM, in some cases, PHY layer echo cancellation may not be adequate to reduce the effect of the interference. Accordingly, FDX DOCSIS can provide techniques whereby CMs that interfere with each other can be classified into an interference group (IG). CMs in the same IG can then transmit or receive along the same direction (US or DS) at a particular frequency band and at a particular time in order to reduce the effects of signal interference. More particularly, an IG can refer to a group of CMs that can interfere with each other when the downstream and upstream channels they share are used in an FDX mode of transmission. This can occur when co-channel interference (CCI) levels at the receiving CMs are above a given threshold when CMs are transmitting simultaneously over the same FDX spectrum.

In some other embodiments, FDX-enabled cable networks can include a procedure called sounding and resource block allocation to mitigate the effects of such interference. In particular, DOCSIS describes protocols for FDX such that a sounding procedure can be used to measure the CM to CM CCI. During such sounding, the CMTS can select one or more FDX-capable CMs as test CMs to transmit test signals on particular subcarriers; moreover, the CMTS can designate other FDX-capable CMs to compute and report errors, for example, received modulation error ratios (RxMERs) on the same set of subcarriers. The CMTS can repeat this procedure until the interference levels are tested on all relevant subcarriers and between various CM combinations, and then store the information, for example, in tables in memory at the CMTS and/or CMs. The measured CCI, for example, in the form of the RxMERs collected from the measurer CMs, can then be used to sort CMs into IGs.

In another embodiment, in sounding, the different CMs on the cable network can transmit well-known sequences (WKS) in the upstream at given intervals of time. As the CMs round-robin such transmissions over a given sounding time interval, all CMs can receive data transmission from other CMs. Further, the CMs can report measurements of the quality of such data reception from the other CMs to the CMTS or access controller at the end of the sounding interval. For example, a given CM can participate in a sounding procedure and report to the access node controller what was received as follows. A first modem (for example, CM 1) can transmit a WKS, second modems (for example, CMs 2-10) can receive the WKS and determine errors; a second modem (CM 2) can transmit a WKS and third modems (for example, CMs 1 and CMs 3-10) receive the WKS and determine an error rate, and so on. At the end of the sounding interval, the first modem can report to the access node controller the error measurements obtained from communication with the various modems over the sounding interval, for example, the error measurements obtained from communication with CMs 2, 4, 6, CMs 2, 4, 6, and 8 and CMs 1, 2, 9 and 10, and the like. Accordingly, based on such data, the access controller device can classify such modems into interference groups (IGs). Then, the access controller device can schedule different transmission groups (e.g., group 1 including modems 1-3, group 2 including modems 4-7, and the like) to communicate with one another based on the fact that group-to-group transmissions have low error rates. For example, transmission group 1 can transmit upstream while transmission group 2 transmits downstream in the same portion of the spectrum. In another embodiment, the downstream transmission between groups can be a multicast transmission while the upstream transmission can be a unicast transmission. Accordingly, with coordination by the access controller, the CMs can determine what other CMs on the network are capable of receiving. Therefore, each CM can subtract what the CM transmitted from what the CM receives, in order to obtain a signal that was intended to be received. In some embodiments, data can be obtained first in an analog domain over the entire frequency range; then the data can be converted into digital domain and the signals can be subtracted as described above, thereby enabling a FDX mode of operation.

In some embodiments, the disclosure is directed to disabling sounding, resource-block allocation, and/or FDX capabilities in a particular portion of the spectrum used in FDX cable networks. The disclosure further describes using either an upstream mode or a downstream mode of communication in the particular portion of the spectrum originally designated for FDX communication, for a given duration of time. In another embodiment, the disclosure can thereby facilitate an increase in upstream or downstream capacity, for example, a fifteen-fold increase in the upstream or downstream capacity. In some embodiments, resource block allocation can refer to assignment of a sub-band of the FDX-allocated spectrum assigned to a transmission group of FDX CMs based on network capacity and resources in a dynamic fashion. In some embodiments, a resource block can have fixed or variable configured boundaries and can have the capability to be dynamically assigned by the CCAP to any of a set of upstream or downstream combinations, for example, to satisfy network traffic demand and a service provider's objectives.

In some embodiments, by disabling sounding and resource-block allocation in the FDX portion of the cable network communication spectrum, the network architecture for a given cable network can also be simplified, for example, by reducing the number of node-splits in the network. In cable plants, signals can be transmitted and amplified in the return path; however, this may not be easily implemented in FDX without amplifiers, which can add complexity and cost to the cable network.

In some embodiments, the disclosure enables the dynamic (e.g., in dynamic in time) use of upstream or downstream transmission in a static portion of the spectrum that is typically designated for FDX communication by FDX-enabled devices, for example, as specified by the DOCSIS 3.1 standard. In another embodiment, even with the use of amplifiers and node-splits in a cable network, such that a node-zero operation is not fully implemented, the disclosure can enable an increase of the upstream or downstream bandwidth (for example, an approximately thirty percent increase in upstream or downstream bandwidth) as compared with a node-zero case. In another embodiment, node-zero can refer to a situation in which there are no node-splits and no amplifier between the headend and the customer premise in a given cable network deployment.

In some embodiments, every doubling of upstream or downstream capacity in a cable network may save at least a portion of the cable network a node-split. In some embodiments, the disclosure can enable a fifteen-fold increase in upstream or downstream capacity over a portion of the spectrum associated with a FDX mode of operation. For example, the upstream or downstream data transfer rate may increase from approximately 100 Mbps to approximately 1.5 Gbps, thereby saving node-splits and the use of amplifiers in the network. In some embodiments, when a given node is split, half the customers can be serviced with twice the amount of bandwidth available to the group; however, the network may allocate half of the bandwidth to one group and half of the bandwidth to another group. In some embodiments, the disclosure can enable a fifteen-fold increase in upstream or downstream capacity that can be shared among all customers of the network.

In some embodiments, the disclosure can enable simulating a hi-split without necessarily physically implementing the hi-split. In some embodiments, a mid-split can refer to an approximately 50 MHz to approximately 85 MHz split, while a hi-split can refer to an approximately 5 MHz to an approximately 204 MHz split. For example, the disclosure can enable replacing at least some of the amplifiers of the network with the equivalent of a hi-split amplifier. In some embodiments, the simulation of the hi-split can make use of simpler and/or cheaper electronic components in comparison to the hi-split devices.

In some embodiments, a low-split system can represent what is in use today in many cable networks. In the United States, the low-split can refer to approximately 5 MHz to approximately 42 MHz with downstream spectrum beginning at approximately 54 MHz. In Europe, low-split can refer to approximately 5 MHz to approximately 65 MHz with downstream spectrum beginning at approximately 85 MHz.

In other embodiments, there can be various definitions of mid-split. Some mid-split networks had an upstream frequency range of approximately 5 MHz to approximately 108 MHz to 116 MHz. DOCSIS 3.0 can specify an upstream frequency range of approximately 5 MHz to approximately 85 MHz and has a downstream spectrum starting at approximately 108 MHz. In some embodiments, there can be various definitions of hi-split. Some hi-split networks had an upstream frequency range of approximately 5 MHz to approximately 162-174 MHz. Hi-split may not yet be currently used in many existing cable networks.

In some alternative aspects, there can be different general approaches for providing upstream or downstream bandwidth with respect to the RF spectrum in cable networks. The numbers provided herein can represent examples, and variations on the mid-split and hi-split frequency plans used by cable operators. For a low-split, the upstream or downstream frequency range can be from about 5 MHz to about 42 MHz; the RF bandwidth can be about 37 MHz, and the data capacity can be about 120 Mbps. Alternatively or additionally, for a low-split, the upstream or downstream frequency range can be from about 5 MHz to about 65 MHz; the RF bandwidth can be about 60 MHz, and the data capacity can be about 210 Mbps. For a mid-split, the upstream or downstream frequency range can be from about 5 MHz to about 85 MHz; the RF bandwidth can be about 80 MHz, and the data capacity can be about 300 Mbps. For a hi-split, the upstream or downstream frequency range can be from about 5 MHz to about 200 MHz; the RF bandwidth can be about 195 MHz, and the data capacity can be about 700 Mbps to 1 Gbps.

In some embodiments, the node (for example, the CMTS or the controller node) can create management messages that can be transmitted to the cable modems in communication with the node. The management messages can be configured to enable the cable modems to turn the FDX region of the spectrum into a static upstream region or a static downstream region, that is, into a fixed-portion of the spectrum used for upstream or downstream transmissions, respectively. In some embodiments, the management messages can configure the cable modems that, in a particular band, to transmit upstream or downstream only, and further, to not perform sounding from a particular band (for example, to not perform sounding from approximately 108 MHz to approximately 204 MHz). In some embodiments, the management messages can configure the cable modems to not perform any transmissions in a given portion of the spectrum, for example, to not perform any transmissions from approximately 204 MHz to approximately 258 MHz.

In some embodiments, for FDX-enabled cable network deployments using amplifiers, it may not be useful to amplify an FDX signal because upstream and downstream signals occupy the same portion of the spectrum. Therefore, if a given signal is flipped (e.g., if the same portion of the spectrum is used to transmit upstream instead of downstream in a given time interval), amplifiers may not be able to discern what part of the signal to amplify. Accordingly, resource blocks can be used to allocate spectrum. For example, the resource blocks can be used to designate that a first portion of the spectrum is to be used for upstream transmissions for a given first cable mode, a second portion of the spectrum is to be used for downstream transmissions for a second cable modem, and so on. Further, the cable modems may need to be periodically resynchronized, and sounding may need to be repeated.

However, the disclosure here describes systems, methods, and apparatuses which may not need any such resource block allocations. Instead, the disclosure describes determining a particular portion of the spectrum (e.g., the full-duplex portion of the spectrum) to be used for upstream or downstream transmission only (e.g., in a half-duplex mode of communication). Accordingly, cable networks that implement aspects of the disclosure can make use of amplifiers amplifying upstream signals instead of a CMTS or node controller which handles the messaging in addition to incurring additional fiber costs. That is, the controller nodes can be remote PHY devices (RPDs) and may therefore need independent fiber nodes to the RPDs.

In some embodiments, control messages can be transmitted down from the controller node to the cable modems periodically, for example, every approximately 2 milliseconds to approximately 200 milliseconds. The control messages can include medium access control (MAC) management messages, describing usage of spectrum. In some embodiments, the messages can describe frequency allocation for a period of time in the future. In some embodiments, the messages can include broadcast messages and unicast messages. In some embodiments, broadcast messages can be transmitted by a control device (e.g., the CMTS or node controller) to one or more receiving devices (e.g., the CMs) when the CMs are using the same portion of static spectrum. In some embodiments, unicast messages can be transmitted by the CMTS or node controller to the CMs to communicate changes in the FDX region of the spectrum. In some embodiments, such unicast messages can be transmitted periodically, for example, every 2 milliseconds.

In some embodiments, the messaging can be performed using a bitmask. A bitmask can refer to a binary number or a bitmap where the desired bit(s) are one and the remaining zero. For example, by performing a bitwise AND operation of a value with a bitmask, it can be determined whether certain bits are ones. In some embodiments, the bitmask can be configured such that it returns a 0 on upstream signals and a 1 on downstream signals, or vice-versa. In some embodiments, the bitmask can have a bandwidth of approximately 1 bit per MHz.

In some embodiments, the messaging can include a type-length-value or tag-length-value (TLV) message. In some embodiments, TLV can refer to an encoding scheme for certain communications protocols. In some embodiments, the type and length of the TLV message can be fixed in size (for example, 1-4 bytes), and the value field, representing the instructions to the cable modem devices, can have a variable size. In some embodiments, the fields can be used as follows. The type field can include a binary code, which can be alphanumeric, and can indicate the kind of field that this part of the message represents. A length field can be used to indicate the size of the value field, which can be specified in bytes. As mentioned, the value field can represent a variable-sized series of bytes which contains data, for example, instructions to the cable modems. In some embodiments, the messaging can, alternatively or additionally, include control messages that conform to other communications protocols, for example, transmission control protocol/internet protocol (TCP/IP) protocols (particularly IP, TCP, and user datagram protocol, UDP).

Figure 4:
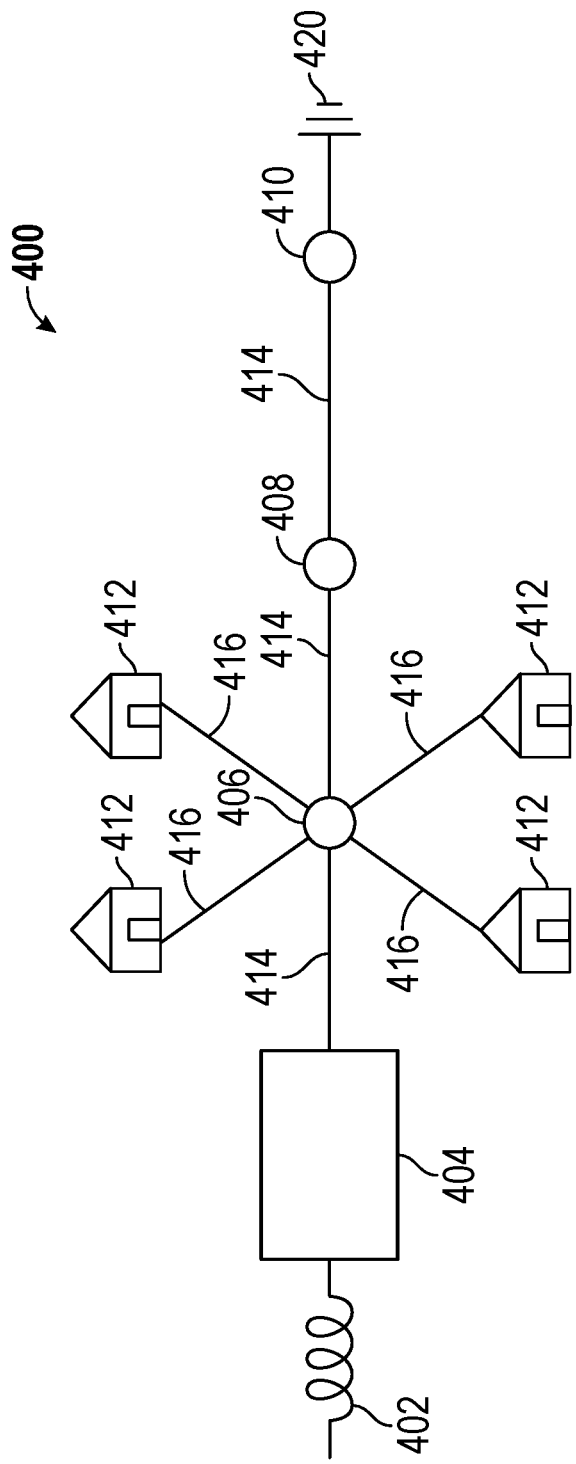
FIG. 4 shows an example diagram of a portion of a cable network and associated devices in a particular network deployment, in accordance with example embodiments of the disclosure.

FIG. 4 shows an example diagram 400 of a portion of a cable network and associated devices in a particular network deployment, in accordance with example embodiments of the disclosure. In some embodiments, the cable network described herein can be implemented using a DOCSIS specification. In an embodiment, there can be a device 404. The device 404 can include a CMTS, which can also be referred to as an access controller, a controller, and/or a node herein. In an embodiment, the device 404 may be connected (e.g., via a fiber 402) to higher levels of a network (e.g., a backbone network) can have a converged cable access platform (CCAP) functionality. In another embodiment, the device 404 can serve as a remote physical (PHY) device, that is, a device having PHY layer functionality (that is, PHY layer functionality as described in connection with the open systems interconnection model, OSI model).

In an embodiment, there can be a fiber 414 connected to the device 404; the device 404 can further be connected to various network cable taps 406, 408, and 410, also referred to as taps or terminations herein, and can connect to various cable modem (CM) devices, for example, at various households 412.

In some embodiments, a cable network can include a fiber optic network, which can extend from the cable operators' headend out to a neighborhood's hubsite, and finally to a coaxial cable node which serves customers, for example, 25 to 2000 households.

In an embodiment, data can be transmitted downstream from the device 404 to one or more homes 412 over drop cables (also referred to as drops herein) 416 using one or more taps 406, 408, and 410, which may be terminated or grounded 420, individually or collectively, or both. In an embodiment, as the data is transmitted downstream from the device 404 to one or more homes 412, the taps 406, 408, and 410 can potentially generate various impairments on the network. Alternatively or additionally, as the signals pass through from the device 404 to the taps 406, 408, and 410 over fibers 414 and to the homes 412 over one or more drops 416, the fibers 414, and/or the drops 416 can cause the signals to undergo various impairments, for example, to the power spectral density of the signals. In an embodiment, the impairment can be due to attenuation on the fibers 414 and/or drops 416. In an embodiment, the impairments can lead to frequency distortions on the signals; for example, the higher frequency end of the signals may be attenuated. Accordingly, in an embodiment, one or more amplifiers (not shown) can be used to perform a gain on the attenuated signals. In an embodiment, the one or more amplifiers can be placed, for example, at one or more of the taps 406, 408, and 410 to perform the gain on the attenuated signals.

In an embodiment, the homes 412, the devices in the homes 412, and taps 406, 408, and/or 410 can introduce different distortions on the drop cables 416 and/or fibers 414. In an embodiment if the distortion is introduced on a given fiber 414 feeding a first tap 406 of the taps 406, 408, and/or 410, different homes of the homes 412 may receive a similar distortion to signals being transmitted and received from one or more devices at the homes 412. In another embodiment, a distortion in at given tap of the taps 406, 408, and/or 410, a distortion at a given drop of the drops 416, or distortions associated with one or more cables and/or wires of one or more devices in a given home of the homes 412, may cause signals being received and transmitted at the various taps 406, 408, and/or 410, and/or signal being transmitted or received by the devices in the different homes 412 to undergo different signal distortions.

Likewise, in an embodiment, if the devices at various homes 412 are transmitting data upstream, the distortion to the signals experienced by devices at different homes 412 can be different. In an embodiment, the disclosed systems, methods, and apparatuses describe techniques by which various devices, for example, the various devices in the homes 412 may need to transmit to account for the different distortions on the network, as described above.

In an embodiment, a given transmitting device on the network can transmit a pre-determined sequence, for example a 32-symbol (or any suitable number of symbol) sequence where each symbol includes a pre-determined amount of data, to the receiving devices. Accordingly, when the receiving devices receive the pre-determined sequence, the receiving devices may be programmed to be able to determine one or more characteristics that the signal associated with the received pre-determined sequence should have. Therefore, the receiving device can determine whether there is a deviation from what the receiving device would have received absent distortions in the received signal.

In an embodiment, the receiving devices can take various measurements, for example, measurements to characterize one or more channels associated with signals received by the receiving device, and/or one or more measurements associated with the received signal from the transmitting device, including, but not limited to, signal-to-noise ratio (SNR) measurements, minimum end-of-line (MER) measurements, slopes measurements, amplitude measurements, ripple measurements, spike (for example, non-linear noise distortions) measurements, absolute received power per subcarrier measurements, error vector magnitude measurements, and the like. The receiving device can then transmit at least portions of the measurements in informational blocks, for example, as data packets, back to the transmitting device. The transmitting device can modify a table based on the received information from the receiving device, for example, a table stored in internal memory. In an embodiment, the table can include information such as what sequence the receiving device would have received absent any distortions to the signal, what sequence the receiving device actually received, what sequence the transmitting device received back from the receiving device (which may also be subject to further distortions), and/or any information indicative of the measurements taken by the receiving device of the channel and/or the received signal, as described above. In some embodiments, the CMTS or controller can determine interference groups (IGs) based on the received information from the receiving devices.

In some embodiments, the cable network as described above can include a regional or area headend/hub. The hub can receive programming that is encoded, modulated and upconverted onto radio frequency (RF) carriers, combined onto a single electrical signal and inserted into a broadband transmitter, for example, an optical transmitter. In some embodiments, the transmitter can convert the electrical signal to a downstream modulated signal that is sent to the nodes. Fiber optic cables connect the headend or hub to nodes in various topologies, including, but not limited to, point-to-point or star topologies, ring topologies, and the like.

By using frequency-division multiplexing, an HFC network such as the one described in connection with FIG. 4 may carry a variety of services, for example, analog and digital TV, video on demand, telephony, data, and the like. Services on these systems can be carried on radio frequency (RF) signals in particular regions of the available spectrum.

The HFC network can be operated bi-directionally such that signals are carried in both directions on the same network. For example, the signals can be transmitted from the headend/hub office to the customer, and from the customer to the headend/hub office. In one aspect, a forward-path or downstream signals can refer to information from the headend/hub office to the customer. In another embodiment, a return-path or upstream signals can refer to information from the customer to the headend/hub office. The forward-path and the return-path can be carried over the same coaxial cable in both directions between the node and the customer equipment.

In some embodiments, HFC network can be structured to be asymmetrical, that is, data transmission in the downstream direction has much more data-carrying capacity than the upstream direction. Full-duplex can refer to a network specification that can improve upon DOCSIS 3.1 to use the full spectrum of the cable plant (for example, from approximately 0 MHz to approximately 1.2 GHz) at the same time in both upstream and downstream directions. This technology may facilitate multi-gigabit symmetrical services while remaining backwards compatible with DOCSIS 3.1.

In various aspects, the device 404 (e.g., a CMTS) may include aspects of the functionality of the management computing entity 100, as shown and described in connection with FIGS. 1-2, above. In particular, the CMTS 402 may include or be in communication with one or more processing elements 205, memory 210, volatile memory 215, and may include a communication interface 220 (e.g., to communicate with between each other and with various customer premise equipment such as cable modems).

Moreover, customer premise equipment at one or more customer homes 412 may include devices that include aspects of the functionality of the user device 110, as further shown and described in connection with FIG. 3, above. For example, customer premise equipment devices may include a transmitter 304, a receiver 306, and/or a network interface (e.g., to communicate with an access point or other device to receive information from the device 404). Moreover, the customer premise equipment devices may include volatile memory 322 and/or non-volatile memory 324 in addition to a processor (e.g., to perform one or more computational tasks, such as processing received signals, etc.). Further, the customer premise equipment devices may include a display 316 and/or a keypad 318 (e.g., for interacting with a user or operator).

Figure 5:
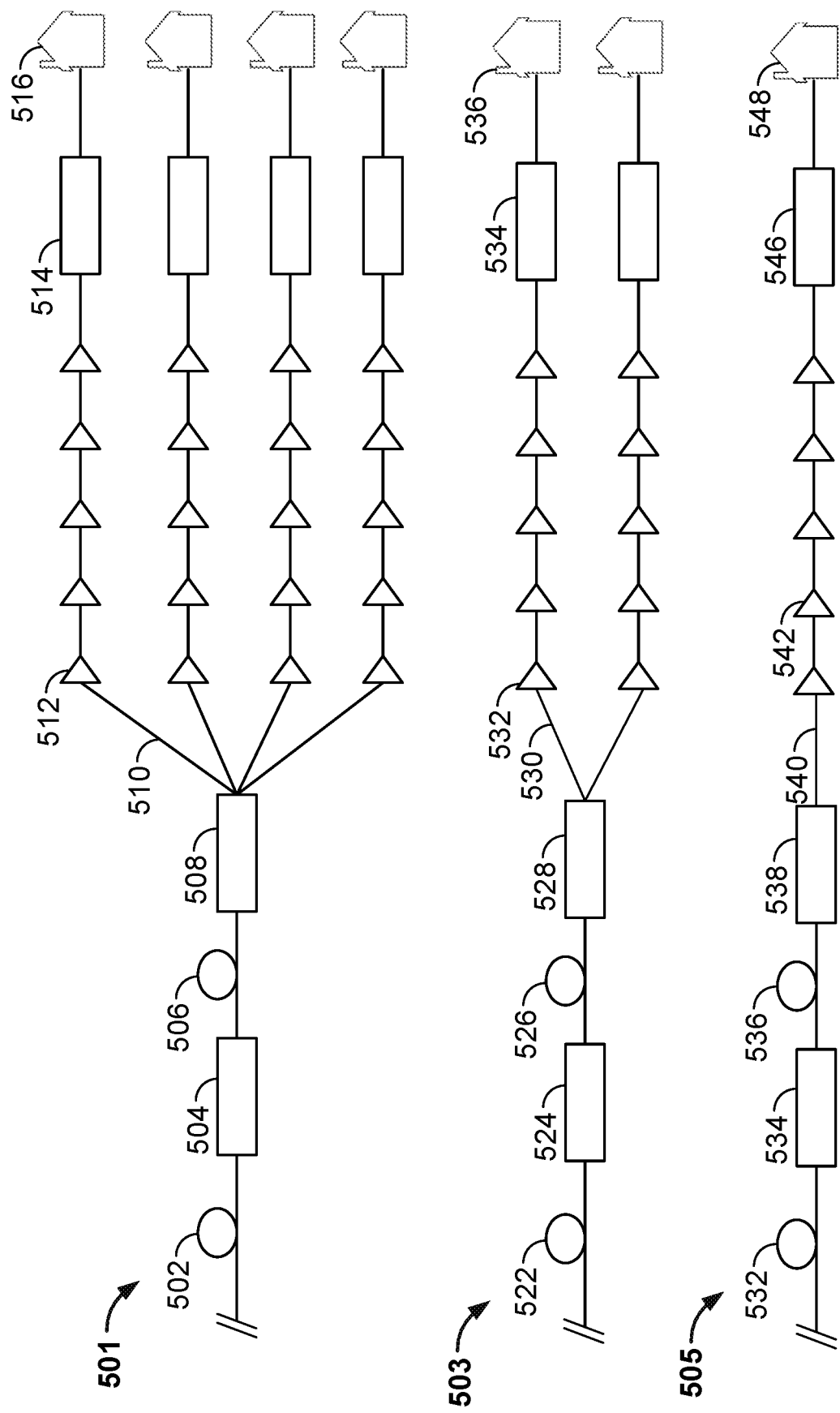
FIG. 5 shows example diagrams of a portion of a network architecture, in accordance with example embodiments of the disclosure.

FIG. 5 shows example diagrams of another network architecture, in accordance with example embodiments of the disclosure. In one embodiment, as shown in diagram 501, device 504 can represent a headend device. In one aspect, device 504 can include converged cable access platform (CCAP) device. CCAP can refer to equipment that combines aspects of the functionality of edge quadrature amplitude modulation (QAM) technology with cable model termination systems (CMTSs) to provide services such as internet and voice over IP while encoding and transmitting digital video channels over the cable network.

In one embodiment, the device 504 can be electronically connected to device 508, which can represent a network node device, for example, a network node device such as remote physical (PHY) device, remote medium access control (MAC) device, and/or remote hybrid PHY/MAC device. In one aspect, the electronic connection between device 504 and device 508 can be via a cable 506, for example, a fiber optic cable. In an embodiment, device 504 and/or 508 can encompass aspects of the functionality of the management computing entity 100, described above. In one embodiment, one or more of the devices 504 and/or 508 can include a switch, for example, a network switch such as an Ethernet switch.

In some embodiments, as shown in diagram 501, the device 508 can be electronically connected to a customer premise, for example, a home 516 (also referred to herein as a household) and various devices associated with the home 516. In another embodiment, the device 508 can be connected via connection 510 to the home 516 through one or more amplifiers 512 and/or one or more taps 514. In some respects, the amplifiers can serve to amplify signals to restore attenuation of the signals during propagation over the network. In another embodiment, diagram 501 can represent a node-x embodiment, where node-x can represent a node having a variable number of amplifiers at a given node-split. In particular, in diagram 501, the network can have 5 amplifiers in each of the 4 node-splits.

Similarly, as shown in diagram 503, the device 528 can be electronically connected to a customer premise, for example, a home 536 (also referred to herein as a household) and various devices associated with the home 536 over connection 530. In another embodiment, the device 528 can be connected to the home 536 through one or more amplifiers 532 and/or one or more taps 534. In the case of diagram 503, the number of node-splits at the device 528 can be less than the number of node-splits in diagram 501 (e.g., two node-splits vs. four node-splits). As noted, in some embodiments, the system represented by diagram 503 may include a source (not shown) which may be connected to device 524 via cables 522 and 526.

Similarly, as shown in diagram 505, the device 538 can be electronically connected to a customer premise, for example, a home 548 (also referred to herein as a household) and various devices associated with the home 548 over connection 540. In another embodiment, the device 538 can be connected to the home 548 through one or more amplifiers 542 and/or a tap 546. In the case of diagram 505, the number of node-splits at the device 538 can be less than the number of node-splits in diagram 503 (e.g., zero node-splits vs. 2 node-splits). Accordingly, diagram 503 can represent a node-zero architecture, which can work without amplifiers. As noted, in some embodiments, the system represented by diagram 505 may include a source (not shown) which may be connected to device 534 via cables 532 and 536.

In some embodiments, the disclosure describes providing the cable networks, such as the node-x and node-zero cable network deployments described above, with the ability to turn off sounding and resource block allocations in a given portion of the spectrum associated with FDX operation. Further, the disclosure describes configuring that portion of the spectrum as being static (i.e., not dynamic) with regards to changes in the starting and ending frequency. In some embodiments, the disclosure describes simulating a hi-split using FDX.

As mentioned, low-split can refer to an approximately 5 MHz to approximately 42 MHz split in the United States. Mid-split can refer to an approximately 5 MHz to approximately 85 MHz split in the United States. Hi-split can refer to an approximately 5 MHz to approximately 204 MHz split in the United States; however, hi-split may not be generally deployed. In some embodiments, if amplifiers are used in a network that makes use of the node-x, the amplifiers may need to be replaced with devices having an approximately 5 MHz to approximately 204 MHz (or higher, up to approximately 684 MHz) return and an approximately 1 GHz to approximately 1.2 GHz forward capability.

In some embodiments, the system represented by diagram 501 (and similarly for diagrams 503 and 505, implicitly described in the following) may include a source (not shown) which may be connected to device 504 via cables 502 and 506. In another embodiment, the system can include additional devices 504 and 508 and a tap or terminator 514. The source may be configured to provide a downstream broadband signal to one or more customer devices and receive upstream signals from the one or more customer devices, for example, customer devices at the homes 516. The devices 504 and 508 may be configured (i) to receive the downstream broadband signal via the cables 502 and 506, (ii) convert the downstream broadband signal into a radio frequency downstream signal, (iii) output the downstream broadband signal onto one or more cable lines (for example, cables 502 and 506) for communication to the one or more customer devices, (iv) receive the upstream signals via the one or more cable lines, and (v) convert the received upstream signals into light signals for communication to the source via the cables 502 and 506. The terminator 514 may be in communication with the devices 504 and 508 via the cables, and the terminator 514 may be configured to output the radio frequency downstream signal for receipt by the one or more customer devices and direct the communication of the upstream signals to the optical fiber node via the one or more cables.

In some embodiments, the source may be a suitable source of broadband content, such as a cable plant. The source may be configured to generate and/or combine any number of data streams and/or data components into a broadband signal that is output by the source for receipt by one or more households, for example, homes 516. For example, the source may be configured to obtain video data streams from one or more content providers, such as television networks, premium content providers, and/or other content providers, and the source may be configured to generate a broadband signal based at least in part on the video data streams. As desired, the source may insert commercials and/or other data into a television or video component of a broadband signal. Additionally, the source may be configured to generate or obtain any number of data components that are inserted or added to a broadband signal, such as television guide data, an Internet data signal, home security data signals, voice over internet protocol (VoIP) telephone signals, etc. Any number of modulation techniques and/or data standards may be utilized by a source in the generation or compilation of a broadband data signal. For example, television data may be modulated utilizing a suitable quadrature amplitude modulation (QAM) or other modulation technique, and the modulated data may be incorporated into the broadband data signal. As another example, an orthogonal frequency-division multiple access (OFDMA) technique, a time division multiple access (TDMA) technique, an advanced time division multiple access (ATDMA) technique, a synchronous code division multiple access (SCDMA) technique, or another suitable modulation technique or scheme may be utilized to modulate data included within the broadband data signal. The broadband data signal may be configured to provide a wide variety of services to one or more households, including but not limited to, television service, telephone service, Internet service, home monitoring service, security service, etc.

In certain embodiments, the generated broadband signal may be output utilizing one or more cables 502 and/or 506, for example, fiber optic cables or optical fibers that are configured to carry the broadband signal from the source to one or more corresponding devices, for example, devices 504 and 508. For example, the radio frequency broadband signal may be processed utilizing one or more suitable wavelength-division multiplexing (WDM) devices or WDM systems, and the processed signal may be provided to or driven onto an optical fiber. A wide variety of different types of WDM devices may be utilized as desired in various embodiments of the disclosure, such as dense WDM devices and add-drop WDM devices. As desired, a WDM device may include a terminal multiplexer component that includes one or more wavelength converting transponders. Each wavelength converting transponder may receive one or more components of the input broadband signal and convert that signal into a light signal using a suitable laser, such as a 1550 nm band laser. The terminal multiplex may also contain an optical multiplexer configured to receive the various 1550 nm band signals and place or drive those signals onto a single optical fiber.

As desired, the WDM device may amplify the broadband signals that are processed by the WDM device. Additionally or alternatively, one or more line repeaters or other amplifying devices (such as amplifiers 512) may be positioned along a length of the optical fiber in order to amplify the broadband signal and compensate for any losses in optical power.

In addition to processing downstream or forward path signals that are received from the source, the WDM device may be configured to receive and process upstream signals that are communicated to the source from the households, for example, from homes 516. Cables, for example cables 502 and 506 (which can include, for example, optical fibers) may be configured to carry broadband signals between the source the devices 504 and 508, and the taps 514. These signals may include forward path signals generated by the source and return path signals generated by one or more households, for example, from homes 516. A wide variety of different optical fibers may be utilized as desired in various embodiments of the disclosure, such as multi-mode fibers, single-mode fibers, and special purpose fibers. Additionally, the optical fibers may be constructed from a wide variety of different materials, such as silica, fluorides, phosphates, and/or chalcogenides. The optical fibers may be configured to carry signals as light pulses utilizing total internal reflection.

Moreover, any number of devices 504 and 508, which can alternatively or additionally be referred to as fiber nodes may be provided. Each fiber node may be configured to receive and process downstream or forward path signals from the source. Additionally, each fiber node may be configured to receive and process upstream or return path signals received from the one or more households.

In some embodiments, once a signal has been filtered out or otherwise isolated by the amplifiers 512, the amplifiers 512 may amplify the signal. For example, the amplifiers 512 may increase the amplitude of the signal. In certain embodiments, the various components of a broadband signal (e.g., low return path, forward path, high return path) may be amplified by respective amplification components of the amplifiers 512. Each amplified signal may then be output onto or driven back onto the cable line in a desired direction for the signal. As desired, any number of diodes or other suitable devices may be incorporated into the amplifiers 512 in order to prevent or limit undesired leakage of an amplified signal in a direction from which the signal was received. For example, the amplifiers 512 may receive a return path signal from a terminator 514 or other amplifier, the amplifiers 512 may amplify the signal, and the amplifier may output the signal in an upstream direction towards devices 504 and 508 and/or source while limiting the output or leakage of the signal in a downstream direction.

The amplifiers 512 may include a wide variety of gains as desired in various embodiments of the disclosure. Additionally, as desired, different gains may be utilized for different components of a broadband signal. In certain embodiments, the amplifiers 512 may be powered by a received broadband signal, such as a received downstream signal. Additionally or alternatively, the amplifiers 512 may be powered by one or more batteries and/or external power sources. In certain embodiments, the power requirements of the amplifiers 512 may be based at least in part on the modulation technique(s) utilized in association with the broadband signals that are amplified. In one example embodiment, a relatively low power amplifier may be provided in association with an OFDMA modulation technique.

Any number of terminators 514 or taps may be connected to a cable line. A terminator 514 may form an access point from which one or more households, such as households 516, may be provided with broadband services. Any number of households may be serviced by a terminator 514 as desired in various embodiments of the disclosure. For example, in certain embodiments, up to four households may be serviced by a terminator 514. As desired, a cable drop or other signal line (e.g., a coaxial cable or RF cable) may extend from the terminator 514 to a household 516. In this regard, signals may be provided to and/or received from the household 516.

In an embodiment, the signals transmitted between the CTMS and the CMs can be purified via echo cancellation both in the analog and digital domain. In another embodiment, an analog echo canceller can reduce the echoes of the signal in the analog domain. In an embodiment the analog echo canceller can reduce the echo, group delay, noise amplitude, and the like, of the signal. The signal can, alternatively or additionally, proceed to an analog-to-digital converter (ADC) for conversion to the digital domain. In an embodiment, the signal can proceed thereafter to a digital echo canceller, which can remove echoes and the like in the digital domain. In an embodiment, the output of the digital echo canceler can be transmitted from the CMTS to a device, for example, a cable modem.

In various aspects, the devices 504 and 508 (e.g., fiber nodes) may include aspects of the functionality of the management computing entity 100, as shown and described in connection with FIGS. 1-2, above. In particular, the devices 504 and 508 may include or be in communication with one or more processing elements 205, memory 210, volatile memory 215, and may include a communication interface 220 (e.g., to communicate with between each other and with various customer premise equipment such as cable modems).

Moreover, the customer premise equipment devices at the household 516 may include devices that include aspects of the functionality of the user device 110, as further shown and described in connection with FIG. 3, above. For example, customer premise equipment devices may include a transmitter 304, a receiver 306, and/or a network interface (e.g., to communicate with an access point or other device to receive information from the devices 504 and 508). Moreover, the customer premise equipment devices may include volatile memory 322 and/or non-volatile memory 324 in addition to a processor (e.g., to perform one or more computational tasks, such as processing received signals, etc.). Further, the customer premise equipment devices may include a display 316 and/or a keypad 318 (e.g., for interacting with a user or operator).

Figure 6:
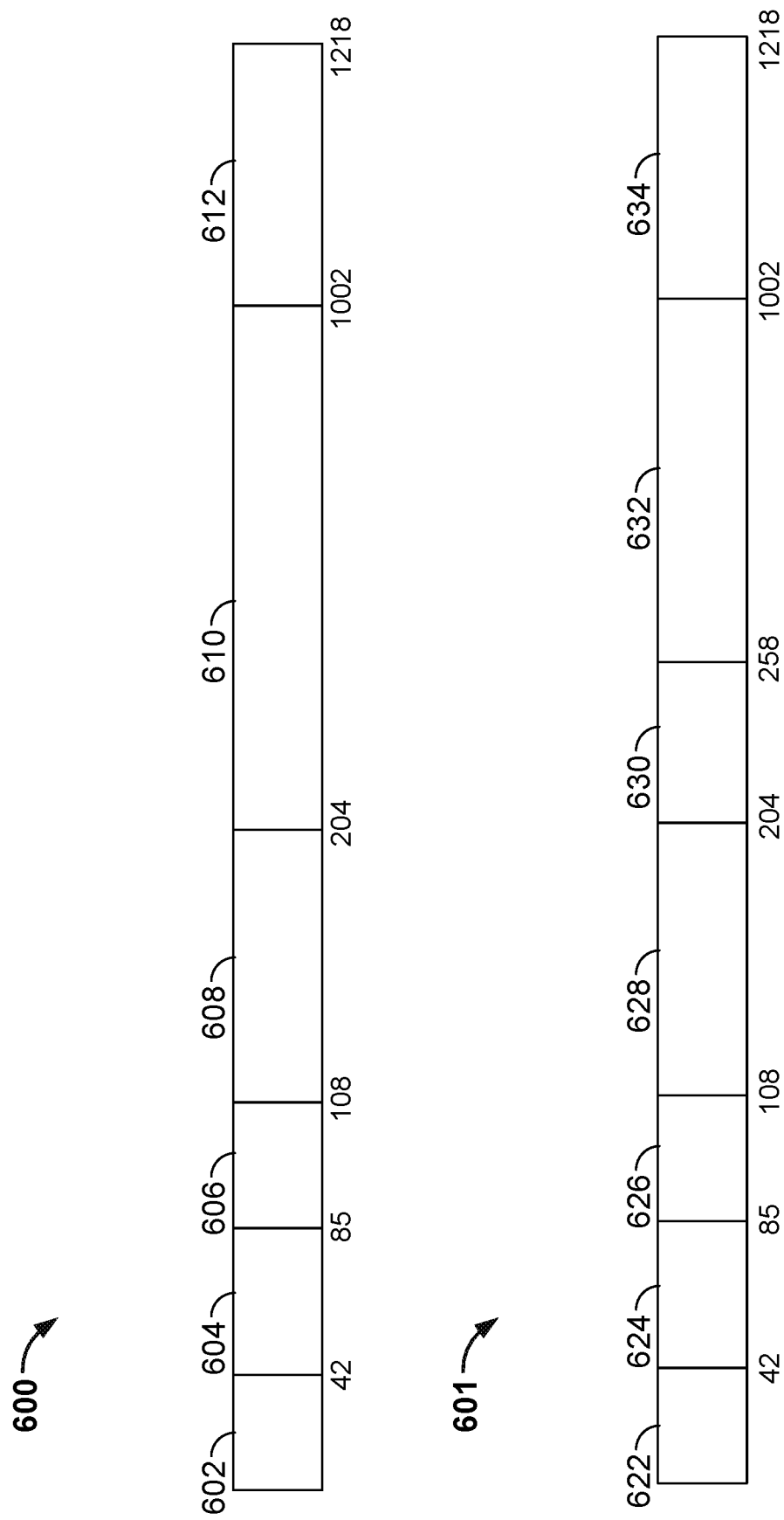
FIG. 6 shows diagrams of example spectra used in connection with the cable networks and devices described herein, in accordance with example embodiments of the disclosure.

FIG. 6 shows diagrams of example spectra used in connection with the cable networks and devices described herein, in accordance with example embodiments of the disclosure. In particular, in diagrams 600 and 601, the frequency represented by the horizontal axis can go from approximately 5 MHz to approximately 1.2 GHz. In some embodiments, diagram 600 can represent a node-zero (that is, a node having a no splits) frequency band allocation scheme. In another embodiment, diagram 600 can represent an approximately 5 MHz to approximately 85 MHz legacy return, and an approximately 1.0 GHz to approximately 1.2 GHz forward. In some embodiments, the legacy forward portion of the spectrum in diagram 600 can start at approximately 204 MHz and can depend on the frequencies allocated to the FDX band. In some embodiments, the FDX band can include at least a 96 MHz bandwidth. In another embodiment, the FDX band can be from approximately 108 MHz to approximately 204 MHz. In some embodiments, the FDX band can be extended to 684 MHz for some networks having particular devices capabilities.

In some embodiments, diagram 601 can represent a node-x (that is, a node having a variable number of splits) frequency band allocation scheme. In another embodiment, diagram 601 can represent an approximately 5 MHz to approximately 204 MHz return, and an approximately 1.0 GHz to approximately 1.2 GHz forward. In another embodiment, legacy devices can use an approximately 5 MHz to approximately 85 MHz return. In some embodiments, the legacy forward portion of the spectrum in diagram 601 can start at approximately 258 MHz.

In some embodiments, the spectrum represented in both diagrams 600 and 601 can be partitioned into different portions. A legacy upstream portion 602 and 622 can exist from approximately 5 MHz to approximately 42 MHz. This region can be used for DOCSIS 3.0 (and earlier) enabled devices using single carrier quadrature amplitude modulation (SC-QAM). In another embodiment, the legacy upstream portion 602 and 622 can use time division multiple access (TDMA).

In some embodiments, the portion of the spectrum from approximately 42 MHz to approximately 85 MHz can represent a portion of the spectrum 604 and 624 implementing DOCSIS 3.1 enabled devices and using orthogonal frequency-division multiple access (OFDMA). In some embodiments, the portion of the spectrum 604 and 624 can be used for upstream communication.

The portion of the spectrum from approximately 85 MHz to approximately 108 MHz can represent a portion of the spectrum 606 and 626 that may not be used for network communications, for example, because of the way some cable modems and/or other electronic devices are designed. This can have to do with various factors, for example, device roll-off considerations and other electronic device constraints.

In diagram 600, the portion of the spectrum from approximately 108 MHz to approximately 204 MHz can represent a portion of the spectrum 608, which can be designated for FDX transmissions in both the upstream and the downstream for FDX-enabled devices. In some embodiments (not shown), the portion of the spectrum designated for FDX transmission can extend to approximately 684 MHz, for example, because silicon analog-to-digital converters (ADCs) may be able to handle 12-bit analog-to-digital (ADC) conversion. Then the portion of the spectrum ending wherever the FDX portion ends (either approximately 204 MHz or approximately 684 MHz) to approximately 1 GHz can be reserved as a portion of the spectrum 610 for communication comprising legacy downstream, single carrier QAM, DOCSIS 3.0 and earlier, and OFDM for DOCSIS 3.1.

In some embodiments, the portion of the spectrum 612 over approximately 1 GHz to approximately 1.2 GHz can be used for OFDM DOCSIS 3.1, since DOCSIS 3.0 devices or earlier may not be able to tune into 1 GHz or greater portions of the spectrum.

In diagram 601, the portion of the spectrum from approximately 108 MHz to approximately 204 MHz can represent a portion of the spectrum 628 which can be designated for upstream communication only or for downstream communication only (for a given time interval), with FDX mode and resource block allocation disabled for FDX-enabled devices. In another embodiment, the region of the spectrum from approximately 204 MHz to approximately 258 MHz can represent a portion of the spectrum 630 representing an amplifier diplex filter roll-off region. Then the portion of the spectrum from approximately 258 MHz to approximately 1 GHz can be reserved as a portion of the spectrum 632 for legacy downstream communication including single carrier QAM (SC-QAM), DOCSIS 3.0 and earlier, and OFDM for DOCSIS 3.1. In some embodiments, the portion of the spectrum 634 over approximately 1 GHz to approximately 1.2 GHz can be used for OFDM DOCSIS 3.1, since DOCSIS 3.0 devices or earlier may not be able to tune into 1 GHz or greater portions of the spectrum.

Figure 7:
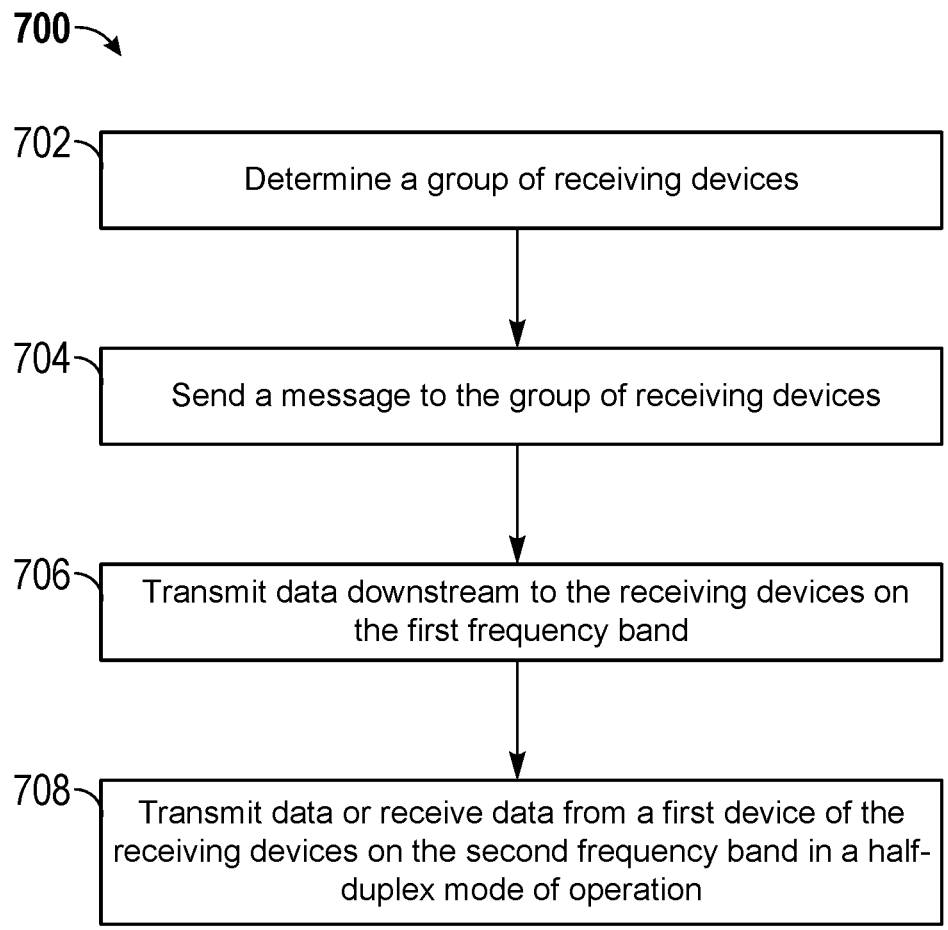
FIG. 7 shows a diagram of an example flowchart for operating the example devices and cable networks described herein, in accordance with example embodiments of the disclosure.

FIG. 7 shows a diagram 700 of an example flowchart for operating the example devices and cable networks described herein, in accordance with example embodiments of the disclosure. At block 702, a group of receiving devices can be determined. In some embodiments, the group of receiving devices can be determined by a given device (e.g., by a CMTS or an access controller device). In another embodiment, the group of receiving devices can include devices configured to communicate in a FDX mode of communication in the second frequency band. In some embodiments, the determination of the group of receiving devices can be performed using a broadcast message. In another embodiment, the determination of the group of receiving devices can include the CMTS or access controller device transmitting probe requests to one or more receiving devices, obtaining a probe response including receiving device capabilities, and an authentication and/or authorization process.

At block 704, a message can be sent to the group of receiving devices. In some embodiments, the message can include a first frequency band for receiving downstream communication from the headend device. In another embodiment, the message can further include a second frequency band (e.g., a second frequency band corresponding to a full-duplex region of the spectrum) for upstream communication or downstream communication from a first device of the receiving devices to the headend device or for an upstream communication from the first device to a second device of the receiving devices.

In some embodiments, the message can include instructions to disable sounding and resource block allocation in the second frequency band. In some embodiments, the message can include a type-length-value (TLV) message. In some embodiments, the first frequency band can include a start frequency of approximately 258 MHz, and an end frequency of approximately 1218 MHz. In another embodiment, the second frequency band includes a start frequency of approximately 108 MHz, and an end frequency of approximately 204 MHz. In one embodiment, the upstream communication can include a unicast transmission. In another embodiment, the first message can include a multi-cast transmission.

At block 706, data can be transmitted downstream to the receiving devices on the first frequency band. In some embodiments, the data can include data transmitted downstream from the CMTS to one or more CMs over an approximately 258 MHz to approximately 1002 MHz band and the data can be encoded in a QAM scheme. In some embodiments, the data can include data transmitted downstream from approximately 258 MHz to approximately 1002 MHz and can be transmitted in accordance with DOCSIS 3.0 or 3.1 specifications. In some embodiments, data can include multimedia content, for example, video transmission. In some embodiments, the data can include data transmitted downstream from approximately 258 MHz to approximately 1002 MHz and can be transferred at a rate of approximately 3 Gbps to approximately 6 Gbps.

In some embodiments, the data can include data transmitted downstream from the CMTS to one or more CMs over an approximately 1002 MHz to approximately 1218 MHz band. In some embodiments, the data can include data transmitted downstream from approximately 1002 MHz to approximately 1218 MHz and can be transmitted in accordance with DOCSIS 3.1 specifications. In some embodiments, data can include multimedia content, for example, video transmission. In some embodiments, the data can include data transmitted downstream from approximately 1002 MHz to approximately 1218 MHz and can be transferred at a rate of approximately 2 Gbps.

At block 708, data can be transmitted to or received from a first device of the receiving devices on the second frequency band in a half-duplex mode of communication. In some embodiments, the received data can include data transmitted upstream from one or more devices (for example, cable modem devices) to the CMTS over an approximately 108 MHz to approximately 204 MHz band. In some embodiments, the transmitted data can include data transmitted downstream to one or more devices (for example, cable modem devices) from the CMTS over an approximately 108 MHz to approximately 204 MHz band. In some embodiments, data can include multimedia content, for example, video transmission. In some embodiments, the data can include data transmitted downstream from approximately 18 MHz to approximately 204 MHz and can be transferred at a rate of approximately 1 Gbps.

Figure 8:
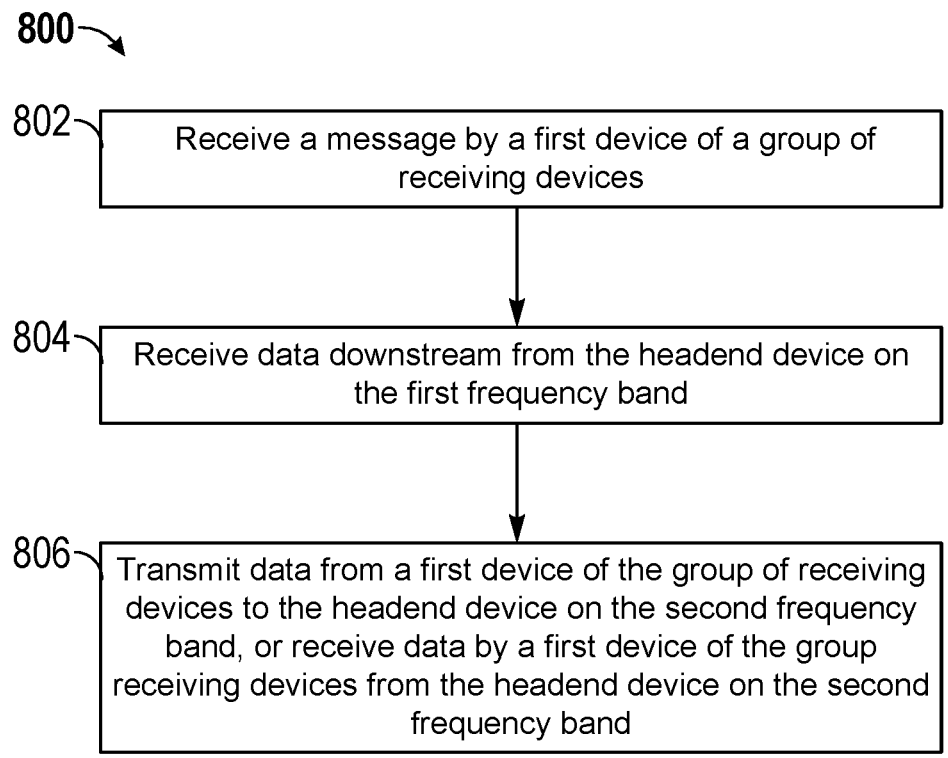
FIG. 8 shows another diagram of an example flowchart for operating the example devices and cable networks described herein, in accordance with example embodiments of the disclosure.

FIG. 8 shows a diagram 800 of an example flowchart for operating the example devices and cable networks described herein, in accordance with example embodiments of the disclosure. At block 802, a message can be received by a first device of a group of receiving devices. In some embodiments, the message can include a first frequency band for receiving downstream communication by the first device from a headend device. In another embodiment, the message can further include a second frequency band for upstream communication from the first device to the headend device or an upstream communication from the first device to a second device of the receiving devices. In another embodiment, the message can include a second frequency band for downstream communication to be received by the first device from the headend device or a downstream communication from the first device to a second device of the receiving devices. In some embodiments, the message can include instructions to configure the group of receiving devices to disable sounding and resource block allocation in the second frequency band.

In some embodiments, the message can include a type-length-value (TLV) message. In some embodiments, the first frequency band includes a start frequency of approximately 258 MHz, and an end frequency of approximately 1218 MHz. In another embodiment, the second frequency band includes a start frequency of approximately 108 MHz, and an end frequency of approximately 204 MHz. In one embodiment, the upstream communication or the downstream communication comprises a unicast transmission. In another embodiment, the first message comprises a multi-cast transmission.

At block 804, data can be received downstream from the headend device on the first frequency band. In some embodiments, the data can be received downstream by one or more cable modem devices. In some embodiments, the message can include a first frequency band for receiving downstream communication from the headend device. In another embodiment, the message can further include a second frequency band for upstream communication from a first device of the receiving devices to the headend device or for an upstream communication from the first device to a second device of the receiving devices. In another embodiment, the message can include a second frequency band for downstream communication to be received by the first device from the headend device or a downstream communication from the first device to a second device of the receiving devices.

In some embodiments, the message can include instructions to disable sounding and resource block allocation in the second frequency band. In some embodiments, the message can include a type-length-value (TLV) message. In some embodiments, the first frequency band includes a start frequency of approximately 258 MHz, and an end frequency of approximately 1218 MHz. In another embodiment, the second frequency band includes a start frequency of approximately 108 MHz, and an end frequency of approximately 204 MHz. In one embodiment, the upstream communication or the downstream communication can include a unicast transmission. In another embodiment, the first message can include a multi-cast transmission.

At block 806, data can be transmitted from a first device of the receiving devices to the headend device on the second frequency band, or data can be received from a headend device by a first device of the receiving devices on the second frequency band in a half-duplex mode of communication. In some embodiments, the transmitted data can include data transmitted upstream from one or more devices (for example, cable modem devices) to a CMTS over an approximately 108 MHz to approximately 204 MHz band. In some embodiments, received data can include multimedia content, for example, video transmission. In some embodiments, the data can include data transmitted downstream from approximately 18 MHz to approximately 204 MHz and can be transferred at a rate of approximately 1 Gbps.

IV. ADDITIONAL IMPLEMENTATION DETAILS

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, an information/data processing apparatus. Alternatively, or in addition, the program instructions can be encoded on an artificially-generated propagated signal, for example a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatuses, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an implementation of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

V. CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A device comprising memory and processing circuitry, the device configured to:
send a message to a group of receiving devices, the message indicating a first frequency band for receiving a first downstream communication from the device, and the message further indicating a second frequency band for:
 (i) a first directional communication between the device and a first device of the group of receiving devices over a first time interval, wherein the first directional communication is either a first upstream communication or a second downstream communication, or
 (ii) a second directional communication between the first device and a second device of the group of receiving devices over a second time interval, wherein the second directional communication is either a second upstream communication or a third downstream communication, and
wherein the message further comprises instructions to disable sounding and resource block allocation in the second frequency band.

2. The device of claim 1, wherein the group of receiving devices comprises devices configured to communicate in a half-duplex mode of communication in the second frequency band.

3. The device of claim 1, wherein the message comprises a type-length-value (TLV) message.

4. The device of claim 1, wherein the first frequency band includes a start frequency of approximately 258 MHz, and an end frequency of approximately 1218 MHz.

5. The device of claim 1, wherein the second frequency band includes a start frequency of approximately 108 MHz, and an end frequency of approximately 204 MHz.

6. The device of claim 1, wherein the first upstream communication comprises a first unicast transmission, and the second upstream communication comprises a second unicast transmission.

7. The device of claim 1, wherein the message comprises a multicast transmission.

8. A device comprising memory and processing circuitry, the device configured to:
receive a message from a first device, the message indicating a first frequency band for receiving a first downstream communication from the first device, and the message further indicating a second frequency band for:
 (i) a first directional communication between the device and the first device over a first time interval, wherein the first directional communication is either a first upstream communication or a second downstream communication, or
 (ii) a second directional communication between the device and a second device of a group of receiving devices over a second time interval, wherein the group of receiving devices comprises the device, and the second directional communication is either a second upstream communication or a third downstream communication,
wherein the message further comprises instructions to disable sounding and resource block allocation in the second frequency band.

9. The device of claim 8, wherein the first device includes a headend device.

10. The device of claim 8, wherein the second device includes a cable modem.

11. The device of claim 8, wherein the device is configured to communicate in a half-duplex mode of communication in the second frequency band.

12. The device of claim 8, wherein the message comprises a type-length-value (TLV) message.

13. The device of claim 8, wherein the first frequency band includes a start frequency of approximately 258 MHz, and an end frequency of approximately 1218 MHz.

14. The device of claim 8, wherein the second frequency band includes a start frequency of approximately 108 MHz, and an end frequency of approximately 204 MHz.

15. The device of claim 8, wherein the first upstream communication comprises a first unicast transmission, and the second upstream communication comprises a second unicast transmission.

16. The device of claim 8, wherein the message comprises a multicast transmission.

17. A system comprising:
   a device comprising memory and processing circuitry; and
   a group of receiving devices comprising memory and processing circuitry;
   wherein the device is configured to:
      send a message to the group of receiving devices, the message indicating a first frequency band for receiving a first downstream communication from the device and the message further indicating a second frequency band for:
         (i) a first directional communication between the device and a first device of the group of receiving devices over a first time interval, wherein the first directional communication is either a first upstream communication or a second downstream communication, or
         (ii) a second directional communication between the first device and a second device of the group of receiving devices over a second time interval, wherein the second directional communication is either a second upstream communication or a third downstream communication,
      wherein the message further comprises instructions to disable sounding and resource block allocation in the second frequency band.

18. The system of claim 17, wherein the group of receiving devices comprises devices configured to communicate in a half-duplex mode of communication in the second frequency band.

19. The system of claim 17, wherein the message comprises a type-length-value (TLV) message.

20. The system of claim 17, wherein the first frequency band includes a start frequency of approximately 258 MHz, and an end frequency of approximately 1218 MHz.

21. The system of claim 17, wherein the second frequency band includes a start frequency of approximately 108 MHz, and an end frequency of approximately 204 MHz.

* * * * *